United States Patent
Gonzales

(10) Patent No.: US 9,883,745 B2
(45) Date of Patent: Feb. 6, 2018

(54) BRACKET FOR FASTENING A PROFILE HANDLE

(71) Applicant: CERMAG COMERCIAL IMPORTADORA E EXPORTADORA LTDA., São Paulo (BR)

(72) Inventor: José Luis Gonzales, Mairiporã (BR)

(73) Assignee: CERMAG COMERCIAL IMPORTADORE E EXPORTADORA LTDA., Sao Paulo, SP (BR)

(*) Notice: Subject to any disclaimer, the term of this patent is extended or adjusted under 35 U.S.C. 154(b) by 98 days.

(21) Appl. No.: 14/898,351

(22) PCT Filed: Jul. 23, 2015

(86) PCT No.: PCT/BR2015/050098
§ 371 (c)(1),
(2) Date: Dec. 14, 2015

(87) PCT Pub. No.: WO2017/011884
PCT Pub. Date: Jan. 26, 2017

(65) Prior Publication Data
US 2017/0164739 A1 Jun. 15, 2017

(51) Int. Cl.
*E05B 1/00* (2006.01)
*A47B 95/02* (2006.01)
*A47B 88/919* (2017.01)

(52) U.S. Cl.
CPC ............ *A47B 95/02* (2013.01); *A47B 88/919* (2017.01); *E05B 1/0015* (2013.01); *A47B 2095/024* (2013.01)

(58) Field of Classification Search
CPC ...... Y10T 16/458; Y10T 16/459; Y10T 16/46; Y10T 16/462; Y10T 16/513; A47B 95/02;
(Continued)

(56) References Cited

U.S. PATENT DOCUMENTS 3,107,389 A * 10/1963 Engelbrecht ........... A47B 47/00
16/416
4,087,141 A * 5/1978 Roberts ................. A47B 95/02
16/412
(Continued)

FOREIGN PATENT DOCUMENTS

BR    PI 1104898-0 A2 *  6/2014

OTHER PUBLICATIONS

International Search Report dated Aug. 14, 2015 in International Application No. PCT/BR2015/050098.*

*Primary Examiner* — Chuck Mah
(74) *Attorney, Agent, or Firm* — B. Aaron Schulman, Esq.; Stites & Harbison, PLLC.

(57) ABSTRACT

A structural arrangement is provided in the form of a bracket for fastening a profile handle, wherein the bracket is constructed and arranged to be fastened by a fastening screw on a top edge of a front wall of a door or a drawer and contains a passing hole able to receive the fastening screw and a pair of side recesses. The pair of side recesses configures a rail for fitting and sliding a pair of tines existing in an inner region of a base of the profile handle, and the bracket includes other features such as having three of four edges of the bracket comprises removable tabs, a rectangular shape, and a configuration wherein the passing hole is positioned in an internal end of the bracket, the internal end being opposite to the edge of the bracket has one of the removable tabs.

2 Claims, 5 Drawing Sheets

(58) Field of Classification Search
CPC ........ A47B 2095/024; A47B 2095/046; A47B 2095/028; A47B 88/919; E05B 1/0015; E05B 1/00

See application file for complete search history.

(56) References Cited

U.S. PATENT DOCUMENTS

| | | | | |
|---|---|---|---|---|
| 4,096,603 A * | 6/1978 | Klaus | ............... | A47B 95/02 16/416 |
| 4,788,745 A * | 12/1988 | Wallis | ............... | E05B 1/0015 16/413 |
| 4,922,576 A * | 5/1990 | Weidner | ............... | E05B 1/0015 16/413 |
| 5,402,553 A * | 4/1995 | Goetz | ............... | E05B 1/0015 16/413 |
| 6,629,339 B2 * | 10/2003 | Pohl | ............... | E05B 1/0015 16/436 |
| 8,931,988 B2 * | 1/2015 | Shimizu | ............... | F16B 37/043 411/55 |
| 9,185,978 B1 * | 11/2015 | Chen | ............... | A47B 95/02 |
| 2003/0145433 A1 * | 8/2003 | Mandel | ............... | E05B 1/0015 16/436 |
| 2005/0066479 A1 * | 3/2005 | Kim | ............... | E05B 1/0015 16/436 |
| 2006/0152120 A1 * | 7/2006 | Wing | ............... | F25D 23/028 312/405 |
| 2008/0060164 A1 * | 3/2008 | Lawler | ............... | E05B 1/0015 16/110.1 |
| 2009/0241323 A1 * | 10/2009 | Wing | ............... | F25D 23/028 29/700 |
| 2011/0169389 A1 * | 7/2011 | Jeffries | ............... | A47B 95/02 312/333 |
| 2011/0179603 A1 * | 7/2011 | Edelen | ............... | A47B 95/02 16/415 |
| 2014/0230332 A1 * | 8/2014 | Martinez | ............... | A47B 95/02 49/353 |

* cited by examiner

BRACKET FOR FASTENING A PROFILE HANDLE

FIELD OF THE INVENTION

This patent of an Utility Model refers to a constructive arrangement in a supporting component and fastening of a profile type handle, through which said handle can be installed on top of the front wall of the drawer or the furniture door.

BACKGROUND OF THE INVENTION

According to state of the art, the profile type handles are basically presented in stylized section "C", and with a length equal to the width of the respective drawers in which they will be installed. The most usual and common form of this type of fastening handle onto the drawer is made through a laminar and vertical projection of the profile, which configures a lower extension of its wall, which projection, after the profile being with its base on the upper edge of the front wall of the drawer, contacts the inner side of said wall and is fastened on it using screws.

The main drawback of this form of fastening is on the fact that the drawer is not completely closed, leaving a small gap resulting from the thickness of said laminar projection of the handle.

The ideal solution to eliminate this problem consists in fastening the handle directly into the top of the front wall of the drawer.

The Applicant holds the invention patent application PI 1104898-0, filed on Nov. 7, 2011 under the title "PROFILE TYPE HANDLE FASTENING SYSTEM", which promotes a completely safe, stable and easily executed fastening of the profile directly on top of the drawer or cabinet door.

For such, the object system mentioned includes as its main component a guide piece or support, basically parallelepiped-shaped, to be fastened by screw on top of the front wall of the drawer, next to each one of its ends, and said piece is provided with recesses in two of its opposite sides, which configure tabs for fitting and sliding the handle through the tines provided in the internal region at the base of the handle.

Additionally, said guide piece is provided on three of its side edges of its base, with removable swallowtail-shaped tabs, which configure the positioning elements of the guide piece on the top or top edge of the front wall of the drawer, in order to secure in the correct position and it aligns with the other ones, delimiting each other a optimum rail for fitting and sliding the handle.

After fastening the guide piece, or bracket, on top of the front wall of the drawer or door of the cabinet, the positioning tabs are removed, being that at least two should be used, one at each end.

However, in the practical use of this invention, the Applicant noted some drawbacks, explained below.

Due the square format of the bracket object of the above claim, the hole to insert the fastening screw is centralized, so that when said bracket is positioned on the edge of the drawer or cabinet door, said hole is very close to the end of said wood edge (MDF or MDP), so that when putting the screw for fastening the bracket, the wood "splinters".

SUMMARY OF THE INVENTION

To work around this problem and no longer damage the wood, the Applicant lengthened the bracket, which has now an elongated rectangular shape, and positioned the mounting hole on its inner edge, i.e., opposite the end where one of the positioning and removable tabs is provided.

Another problem was that the previously proposed model hinders the use of the finishing cover on the end of the profile type handle, since it has a pin that hits the plastic gauge, which does not happen with the new model.

Also, in the guide tab, or bracket, of the previous application, the side fitting and sliding recesses of the corresponding tines in the inner region of the base of the handle are totally straight, at an angle of ninety degrees throughout its length, which makes the correct initial fitting the profile difficult. With that, when fitting the profile in these recesses, the former just "eats" their initial stretch, and sometimes even its entire length, thus damaging the bracket and resulting in a fragile and unstable mounting.

To fix this issue on the bracket component herein innovated, an admission angle was created which increases the height of the recess in its initial stretch, and that favors the introduction of profile, making it substantially easier to mount the profile on the bracket, in addition to prevent the former from damaging the latter.

In addition to these innovations, the object of this application is also provided, inside the mounting hole, with vertical fins that, upon threading the screw on the bracket and into the wood, increases the pressure between those parts, resulting in a substantially steady fixation and totally stable.

Finally, and as an added bonus, it must be stressed that the same bracket can be used to fasten profile type handles into wooden plates 15 and 18 mm thick.

BRIEF DESCRIPTION OF THE DRAWING FIGURES

With the purpose of complementing this description so as to obtain a better understanding of the characteristics of this invention, there are illustrative drawings attached, through which it will be best viewed:

DETAILED DESCRIPTION OF EXEMPLARY EMBODIMENTS

Figure 1:
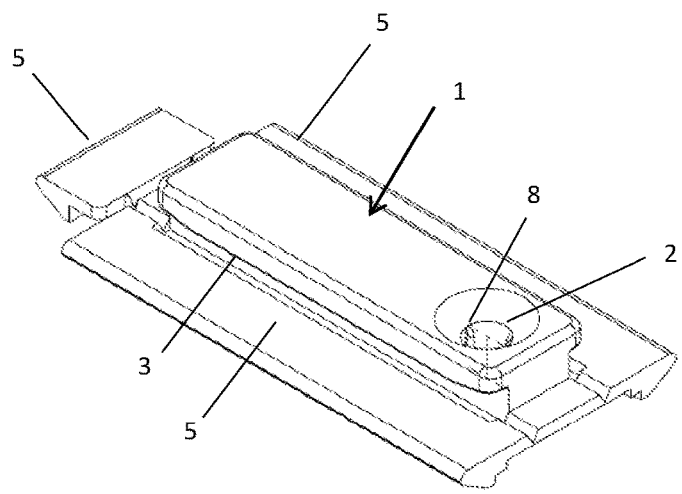
FIG. 1 illustrates, in perspective, the support and fastening component herein innovated.
Figure 2:
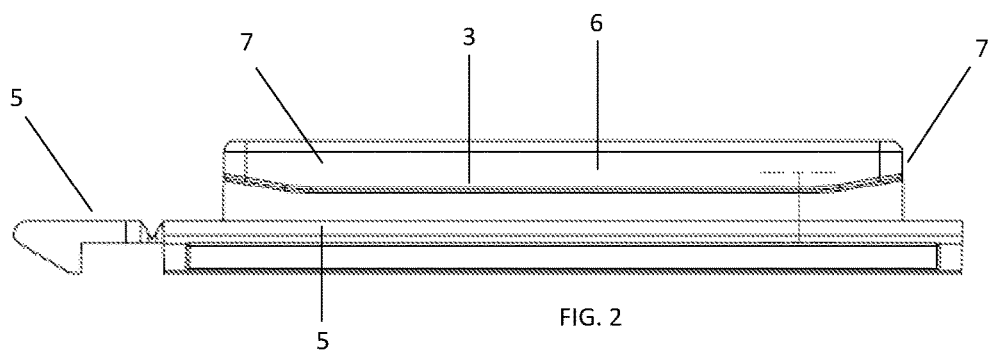
FIG. 2 is a longitudinal view of said support, wherein can be seen the inlet annulus to the fitting of the profile type handle at both ends of the side recess of the bracket.
Figure 3:
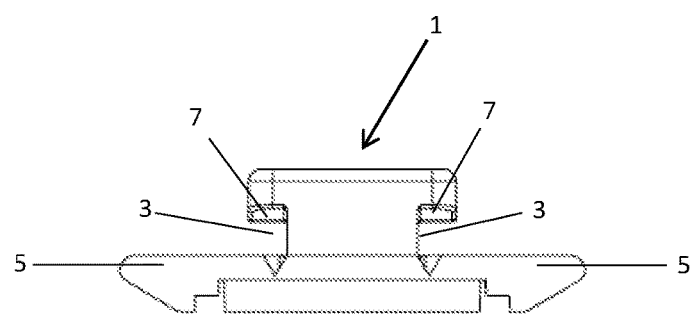
FIG. 3 is a cross-sectional view of it.
Figure 4:
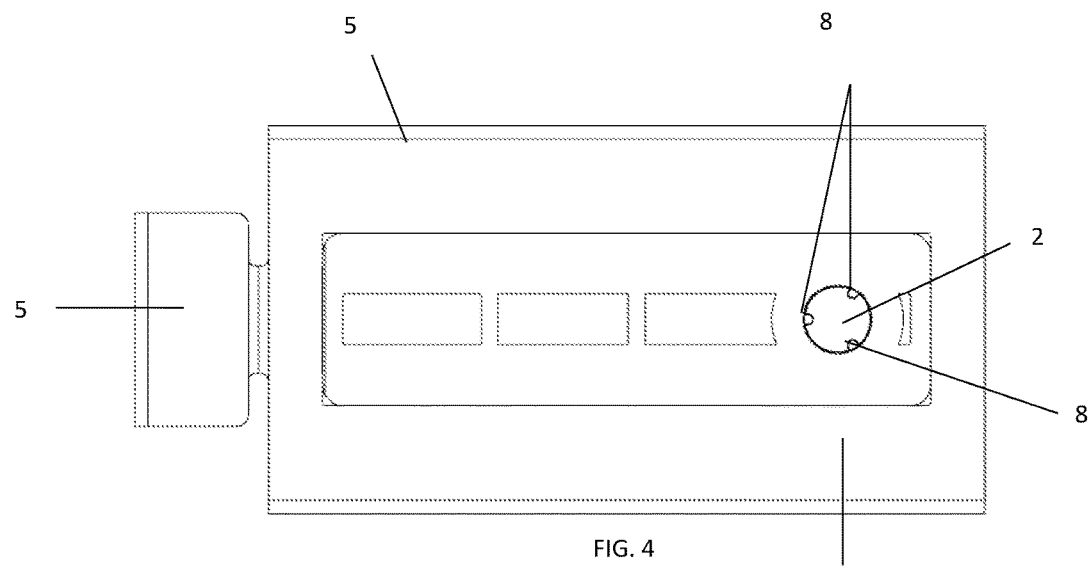
FIG. 4 illustrates said support in bottom view.
Figure 5:
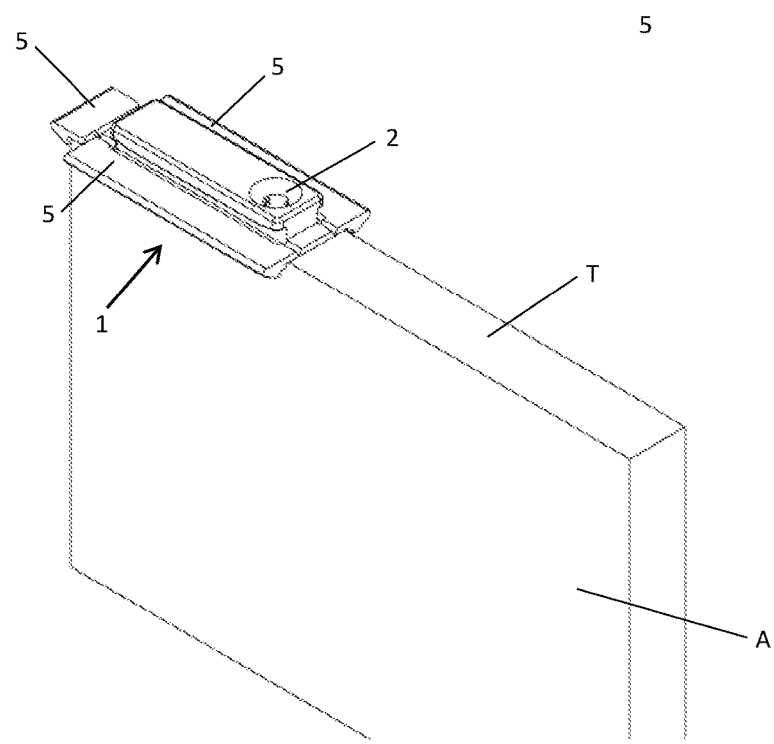
FIGS. 5, 6 and 7 illustrate, in perspective, the sequence of installation of this bracket at the top of a door or drawer, and in FIG. 6 the positioning tabs of the bracket has already been removed.
Figure 6:
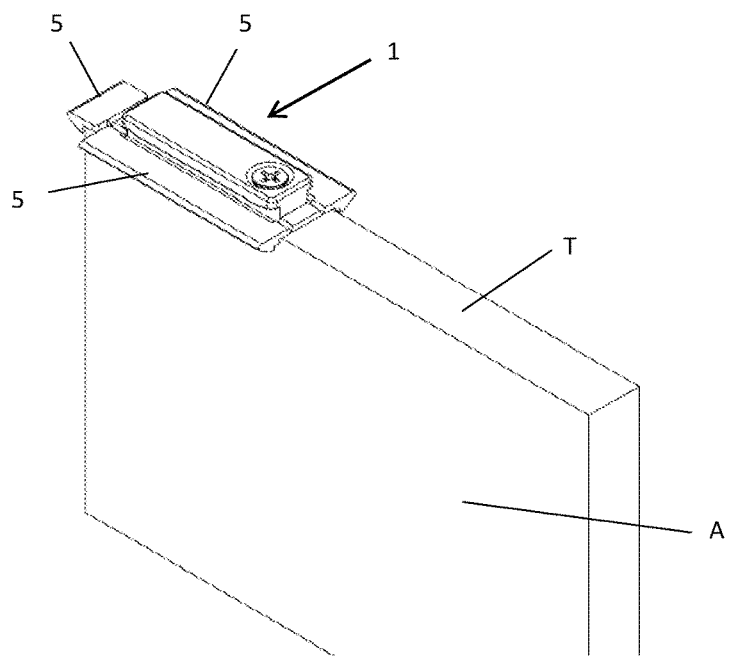
Figure 7:
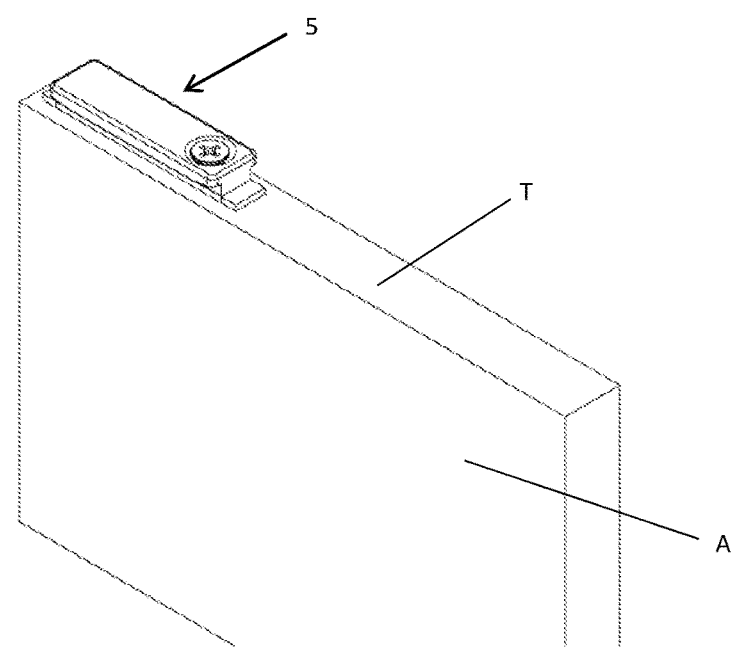
Figure 8:
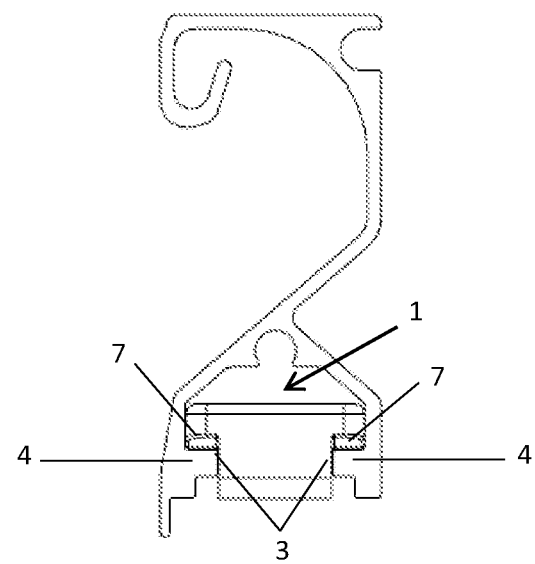
FIG. 8 show a side view of the handle already installed on the bracket, and consequently, on the cabinet door/drawer, but without the finishing cover.
Figure 9:
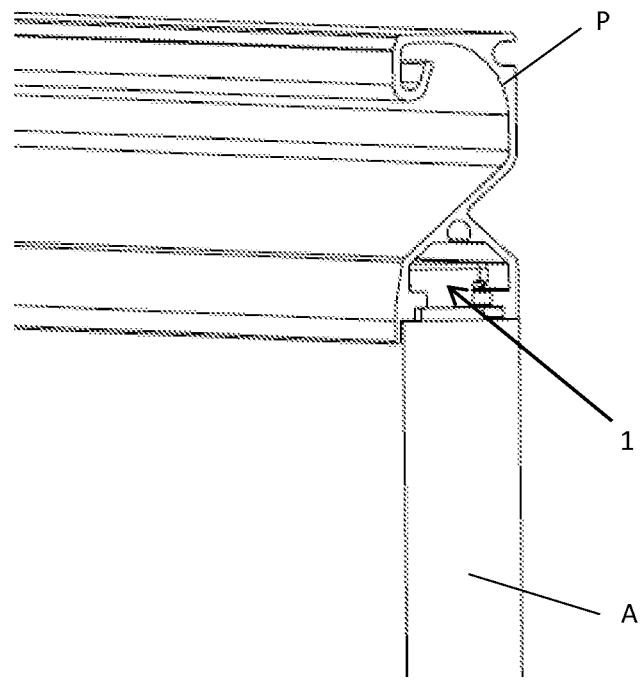
FIGS. 9 and 10 show, in perspective, the handle installed, and in FIG. 10 the profile type handle presents with the finishing cover installed on it.
Figure 10:
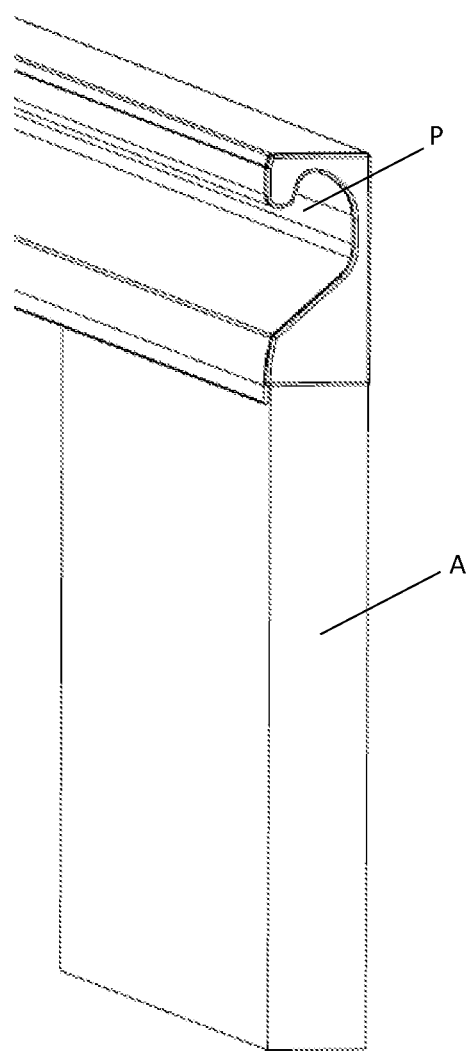

The purpose of this patent of utility model is to provide a constructive engagement in a component for bracketing and fastening of a profile handle wherein a bracket (1) is provided to be fastened by screw on the top edge (T) of the front wall of the door or drawer (A) of the furniture, which support (1) is provided with a vertical and passing hole (2) in order to insert the fastening screw, as well as provided with side recesses (3) and opposite to each other, which configure rails for fitting and sliding of the corresponding tines (4) existing in the inner region in the base of the handle (P). Additionally, three of the four edges of the bracket (1) are provided with removable tabs (5), with the underside in a swallowtail shape, which constitute the positioning elements of bracket (1) on the top or top edge (T) of the drawer or cabinet door (A) for fastening them in the correct position and aligning with the other brackets (1), delimiting each other an optimum trail for the handle (P).

According to this constructive provision, the bracket (1) is presented in rectangular, elongated shape, with the mounting hole (2) positioned in its inner end, opposite to the end where one of the positioning and removable tabs (5) is provided. With that, the mounting hole of the bracket on the top of the wooden plate of the cabinet door or drawer (A) was far from its end, thus eliminating the risk of said wood splintering when the fastening screw is mounted.

In turn, the upper and horizontal wall (6) of the longitudinal side recesses (3) presents their ends (7) leaning upward from the outside in, delimiting a guiding ramp and facilitating the introduction and fitting of the tines (4) of the profile (P), making its mounting in the support (1) substantially easier, in addition to prevent that the former damages the latter.

Additionally, the support (1) herein innovated is provided with vertical fins (8) arranged inside the fastening hole (2), which, upon the threading of the screw on the bracket (1) and in the wood (A), increase the pressure between those parts, resulting in a substantially steady fixation and totally stable between each other.

The invention claimed is:

1. A bracket for fastening a profile handle having four edges, the bracket constructed and arranged to be fastened by a fastening screw on a top edge of a front wall of a door or a drawer, comprising a passing hole able to receive the fastening screw and a pair of side recesses;

wherein the pair of side recesses configures a rail for fitting and sliding a pair of tines existing in an inner region of a base of the profile handle;

wherein three of four edges of the bracket comprises removable tabs, wherein an underside of the removable tabs is defined in a swallowtail format, and wherein the removable tabs constitute bracket positioning elements on the top edge of the drawer or door;

wherein said bracket has a rectangular shape and the passing hole is positioned in an internal end of the bracket, the internal end being opposite to the edge of the bracket that comprises one of the removable tabs; and wherein an upper and horizontal wall of the pair of side recesses have ends leaning upward, delimiting an introduction conducing ramp for the fitting and sliding of the tines of the handle.

2. The bracket for fastening a profile handle according to claim 1, wherein said passing hole further comprises vertical fins that configure anchoring elements of the fastening screw.

* * * * *